United States Patent [19]

Baba

[11] Patent Number: 4,882,843
[45] Date of Patent: Nov. 28, 1989

[54] STRUCTURE OF A HEAD OF A FLEXIBLE FILAMENT TYPE GRASS TRIMMER

[75] Inventor: Toru Baba, Yokosuka, Japan

[73] Assignee: Kioritz Corporation, Tokyo, Japan

[21] Appl. No.: 203,478

[22] Filed: Jun. 6, 1988

[30] Foreign Application Priority Data

Jun. 11, 1987 [JP] Japan .............................. 62-90258[U]

[51] Int. Cl.⁴ ............................................. A01D 50/00
[52] U.S. Cl. ......................................... 30/276; 56/12.7
[58] Field of Search ..................... 30/276, 347; 56/12.7

[56] References Cited

U.S. PATENT DOCUMENTS

| | | | |
|---|---|---|---|
| 4,114,269 | 9/1978 | Ballas | 30/276 |
| 4,161,820 | 7/1979 | Moore | 30/276 |
| 4,203,212 | 5/1980 | Proulx | 30/276 |
| 4,259,782 | 4/1981 | Proulx | 30/276 |
| 4,349,962 | 9/1982 | Itagaki | 30/276 |
| 4,672,798 | 6/1987 | Ota | 30/276 |

*Primary Examiner*—Frank T. Yost
*Assistant Examiner*—Y. Lin
*Attorney, Agent, or Firm*—Bauer & Schaffer

[57] ABSTRACT

A head for a grass trimmer and the structure thereof and in which flexible filaments of a predetermined or required length are payed out by repetitive release and connection of a drive shaft and a spool having the flexible filaments wound thereon and which is easy to mount and remove and which structure makes it convenient to handle the flexible filaments.

4 Claims, 4 Drawing Sheets

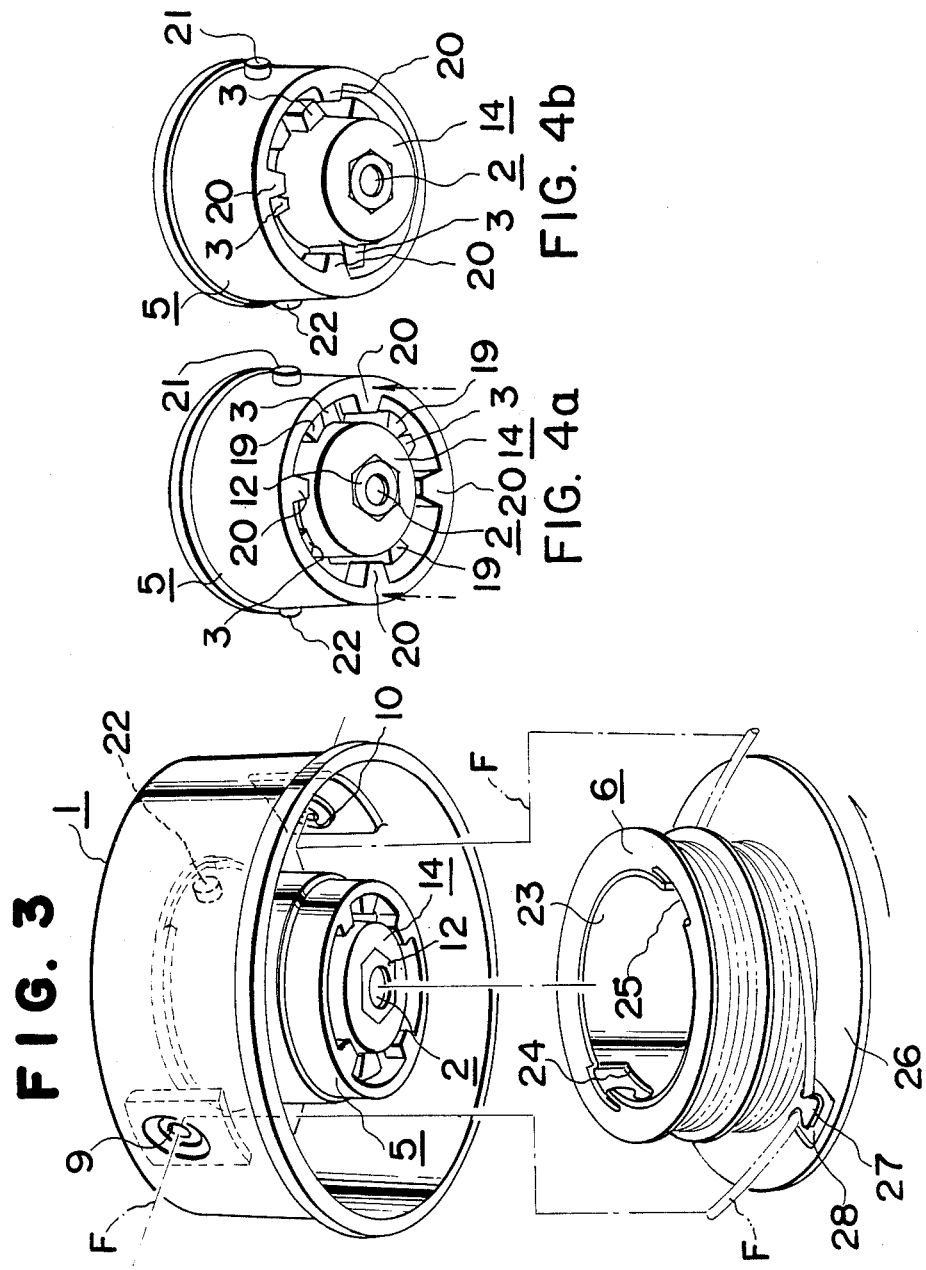

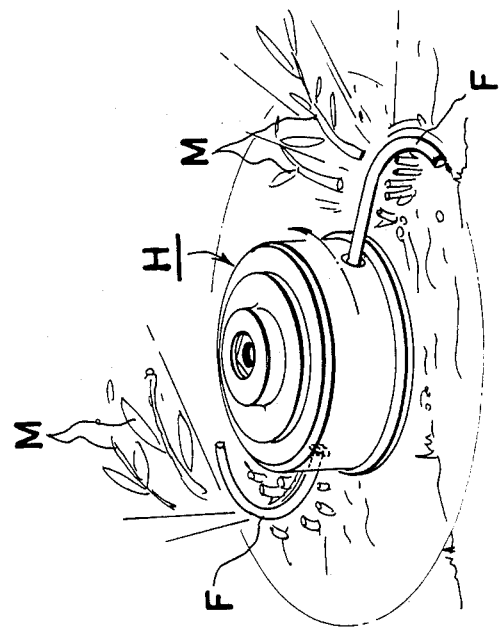
FIG. 6
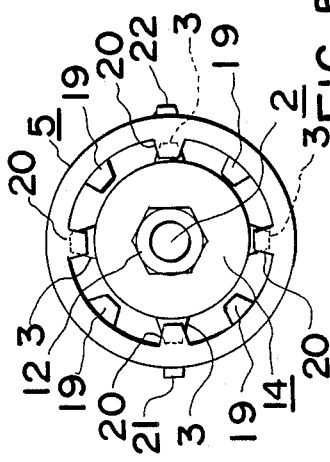
FIG. 5a
FIG. 5b

STRUCTURE OF A HEAD OF A FLEXIBLE FILAMENT TYPE GRASS TRIMMER

FIELD OF THE INVENTION

This invention relates to the structure of a head of a grass trimmer wherein flexible filaments (which shall be merely called nylon cords hereinafter) wound on a spool are provided within a rotary head, the head is rotated with the above mentioned nylon cords pulled by a predetermined length out of the head and grasses are cut by the nylon cords rotated integrally on the outer periphery of the above mentioned head, particularly to make it easy to mount and remove the spool and to handle the nylon cords.

BACKGROUND OF THE INVENTION

As such grass trimmers as of the present invention, there are already provided inventions mentioned in the publications of Japanese patent publications Nos. 22484/1984 (U.S. Pat. No. 4,104,796) and 53562/1985 (U.S. Pat. No. 4,584,771).

The former invention is generally called a full automatic type wherein, for example, when a nylon cord is made short by wear or break, the load on a prime mover will reduce but, on the contrary, the rotating speed will increase and, as a result, a sliding member provided within a head will be moved toward the outer periphery of the head by the action of an increased centrifugal force, the connection of the driving shaft side with the spool side will be released by the action of the above mentioned sliding member, the spool will be made free and will be pulled by the centrifugal force and the nylon cord will be payed out. When the nylon cord becomes long as predetermined, the load on the prime mover will increase but, on the contrary, the rotating speed will reduce and, as a result, the sliding member within the head will be returned to a predetermined position by a spring, the driving shaft side will be connected with the spool side and paying out the nylon cord will be stopped.

In case the operation is normal, this full automatic type will be very convenient but, in case the nylon cord becomes very short due to break or the like, even if the rotation of the engine is increased by operating a throttle lever, no tension by the centrifugal force will act on the nylon cord and the nylon cord will not be payed out or will be payed out while the operator does not know and therefore, in case the amount payed out once is large, a large shock and reaction will be caused to the operator.

In case the above mentioned automatic paying out is not made, in order to release the connection of the driving shaft side with the spool side, such disassembling operation as removing the spool has been necessary.

The above mentioned latter invention is generally called a semi-automatic type wherein, when the spool side wound with the nylon cord is reciprocated by a predetermined stroke in the axial direction of the driving shaft with respect to the driving shaft side, the nylon cord will be payed out by repeating the release and connection of the rotation around the above mentioned shaft in some range between the above mentioned spool side and driving shaft side, therefore, if the reciprocation of the spool is repeated while pulling the nylon cord, the nylon cord will be able to be pulled even by hand and, even in case the nylon cord becomes very short due to break or the like, such disassembling as in the full automatic type will not be required.

The present invention relates to the above mentioned latter invention, that is, the structure of the head of the semi-automatic type.

However, even in the above mentioned conventional semi-automatic type head, that is, the invention mentioned in the publication of the Japanese patent publication No. 53562/1985, in case the nylon cord breaks and comes, for example, into a housing, a machine bolt shown there must be removed and further a filament holding member (spool), first and second engaging means and cover must be disassembled by using tools. Further, this has been the same also in case the nylon cord has become none and must be supplemented.

Also, the nylon cord wound on the spool does not fit the spool and always tends to return to be straight and particularly, when the spool is to be mounted, the nylon cord will be naturally released and will require much trouble to handle.

SUMMARY OF THE INVENTION

In the present invention, such defects as are mentioned above are eliminated, the spool can be mounted and removed easily by hand without requiring to use any tool, further the nylon cord can be temporarily fixed in a proper position at the free end nearly perfectly to the flange of the spool, the spool is mounted in the head, the nylon cord is pulled out of a guide hole of the housing and then the temporarily fixed nylon cord can be easily released from outside.

That is to say, in the present invention, in order to solve the above mentioned problems, in a so-called semi-automatic type nylon cord grass trimmer, between a driving shaft and a spool, there is interposed a spool support repeating the release and connection of the rotation around the above mentioned shaft in some range with fixed pawls provided on the driving shaft by the reciprocation in the axial direction of the driving shaft by a predetermined stroke, a plurality of projections are provided in proper positions on the outer periphery of the above mentioned spool support, substantially L-like grooves in which the above mentioned projections will engage with the head at the front ends in the rotating direction when the spool is rotated as fitted to the above mentioned projections are provided in an inner tube portion of the spool and at least one punched hole in which a nylon cord engaging projection is formed substantially in the central part is provided on an outside flange of the spool.

BRIEF DESCRIPTION OF THE DRAWINGS

The drawings show an embodiment of the present invention.

FIG. 3 is a perspective view showing a spool mounting process.

FIGS. 4(A) and (B) are perspective views showing the relations of fixed pawls and movable pawls.

FIGS. 5(A) and (B) are plan views showing the relations of the fixed pawls and movable pawls.

FIG. 6 is a perspective view showing a using state.

DETAILED DESCRIPTION OF THE INVENTION

Figure 1:
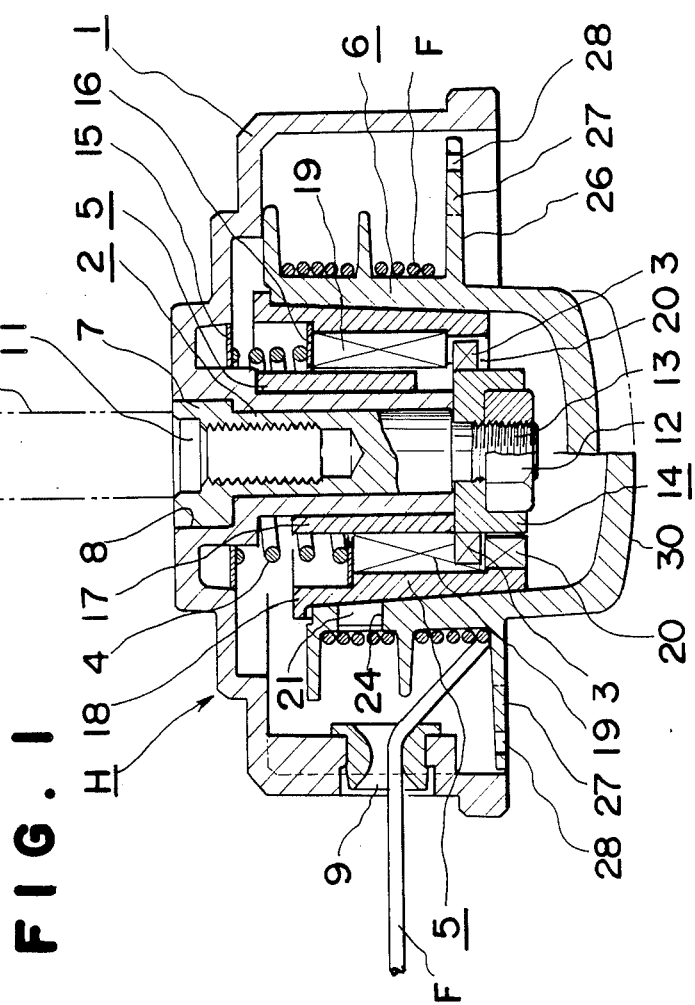
FIG. 1 is a vertically sectioned view.
Figure 2:
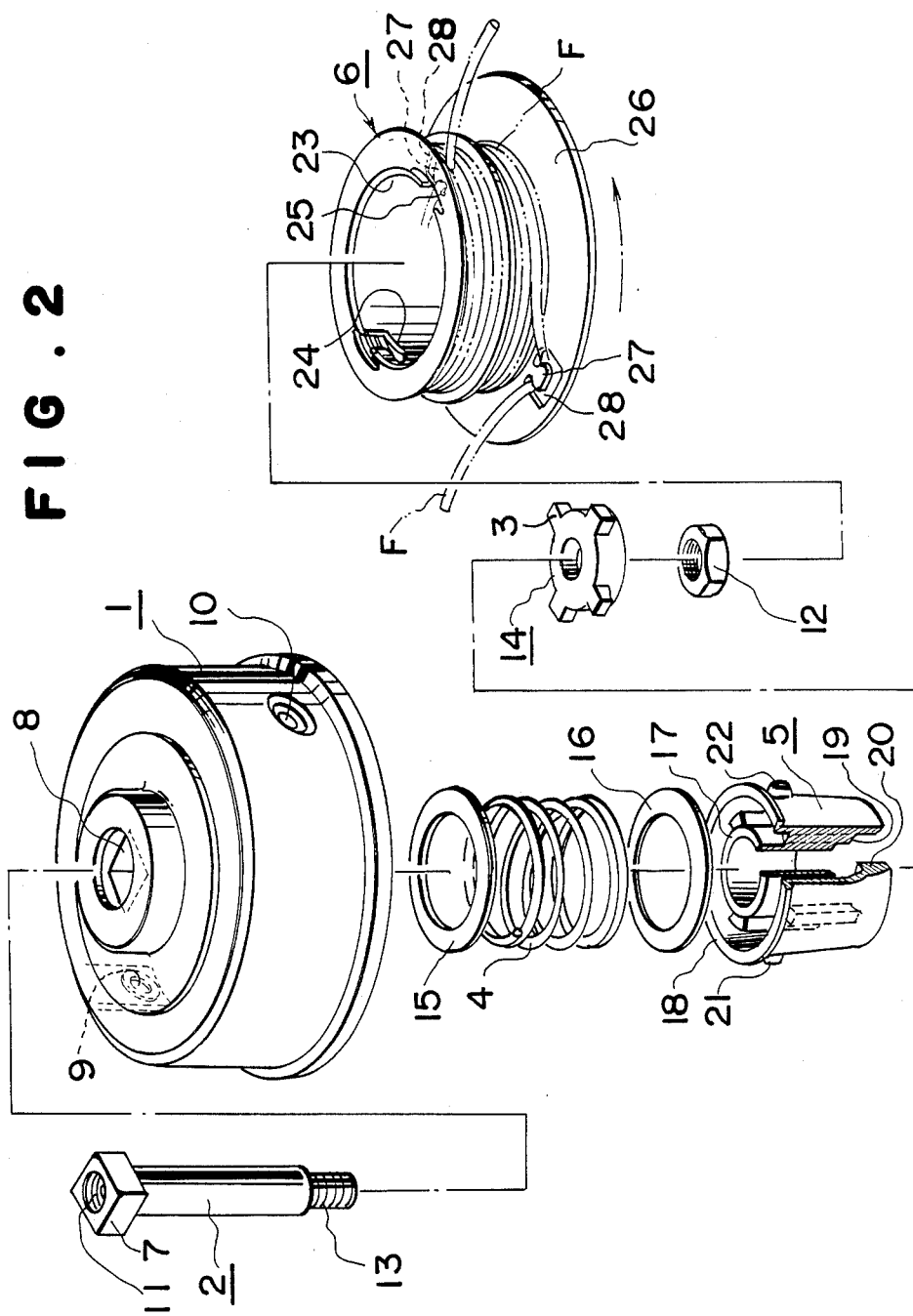
FIG. 2 is a disassembled perspective view.

An embodiment of the present invention shall be explained in detail in the following with reference to the accompanying drawings. FIG. 1 shows a vertically sectioned view of a head H of the present invention and FIG. 2 shows a disassembled view of the same. By the way, in FIG. 1, the left half shows an ordinary cutting state and the right half shows nylon cords as payed out and a spool as moved upward. FIG. 6 illustrates a using state in detail. The entire head H is rotated by such prime mover as an internal combustion engine or electric motor and grasses M are cut by nylon cords F rotated integrally with the head H on the outer periphery thereof.

The above mentioned head H comprises a housing 1, a driving shaft 2, fixed pawls 3, a spring 4, a spool support 5, a spool 6 and others.

First of all, the housing 1 shall be described. The housing 1 is so formed as to be rotated integrally with the driving shaft 2. In the case of the present invention, as described later, a square head 7 formed on the driving shaft 2 and a square hole 8 adapted to the above mentioned square head 7 and made on the housing 1 are to be rotated integrally.

Further, guide holes 9 and 10 through which a proper number of nylon cords F are to be pulled out are made on the outer peripheral surface of the housing 1.

On the driving shaft 2, the above mentioned square head 7 is formed at the upper end, a connecting hole 11 for a driving shaft T on the prime mover (not illustrated) side is made from the upper end to the interior and further a male screw 13 to be screwed with a nut 12 for fixing the fixed pawls 3 and others is formed at the lower end.

By the way, the spring 4 is interposed between the inside surface of the housing 1 and the upper end of the later described spool support 5 so as to always energize the spool support 5 downward. Washers 15 and 16 are arranged respectively above and below the spring 4.

Now, the spool support 5 shall be described. The spool support 5 comprises an inner tube 17 and outer tube 18 and movable pawls 19 and 20 provided between them in two upper and lower steps in the axial direction of the above mentioned driving shaft 2. Needless to say, these movable pawls 19 and 20 are provided integrally with the spool support 5 and are called movable pawls because they are moved vertically up and down with respect to the above mentioned fixed pawls 3.

As illustrated respectively in FIGS. 4 and 5, these movable pawls 19 and 20 are provided as displaced in the peripheral direction in two upper and lower steps at regular intervals the same as in the above mentioned fixed pawls 3 so that the above mentioned fixed pawls 3 may move vertically up and down between them. Needless to say, vertically moving are actually the movable pawls 19 and 20.

A plurality of projections 21 and 22 are provided in proper positions on the outer periphery of the spool support 5.

The spool 6 shall be described in the following. In the embodiment shown in the drawings, the nylon cords F are wound in two upper and lower steps and substantially L-like grooves 24 and 25 in which, when the spool 6 is rotated as fitted to the above mentioned projections 21 and 22, the projections 21 and 22 will engage with the head H at the front ends in the rotating direction in cutting are provided in an inner tube portion 23 of the spool 6.

Further, a punched hole 28 in which a nylon cord F engaging projection 27 is formed substantially in the central part is provided on an outside flange 26 of the spool 6 which is also a bottom cover of the head H. As shown in FIGS. 2 and 3, the nylon cord F may be once led out through the punched hole 28 of the outside flange 26 of the spool 6 from one side of the engaging projection 27 and may be returned to the inside from the outside of the engaging projection 27 so as to be engaged with the engaging projection 27. Thus, the nylon cord F will be temporarily fixed at the end thereof nearly perfectly by the force of the nylon cord F tending to return to be straight.

As shown in FIG. 3, in the head H of the present invention of the above mentioned formation, the housing 1, the driving shaft 2, the fixed pawls 3, the spring 4 and the spool support 5 are integrally assembled.

That is to say, as shown in FIG. 1, the driving shaft 2 is inserted through the square hole 8 of the housing 1; the washer 15, the spring 4, the other washer 16, the spool support 5 and the fixed pawls 3 are fitted in turn to the driving shaft 2 positioned within the housing 1 and the nut 12 is screwed to the male screw 13 at the lower end of the driving shaft 2.

In this state, the driving shaft 2 and the spool support 5 repeat the release and connection of the rotation around the above mentioned shaft 2 in some range as assisted by the fixed pawls 3.

More particularly, during the cutting operation, they are in the state shown on the left side in FIG. 1 and in FIG. 4(A). When the spool support 5 is pushed down by the force of the spring 4, as in FIG. 5(A), the fixed pawls 3 will be positioned between the upper movable pawls 19, the spool support 5 will be released by the stroke between the upper movable pawls 19 and the spool 6 will be able to freely rotate.

Next, when a sliding bowl 30 provided to project on the lower surface of the spool 6 is struck against the ground surface or the like, while the spool support 5 is being moved completely upward (See FIG. 4(B)) as on the right side in FIG. 1, the fixed pawls 3 will disengage from the upper movable pawls 20, the spool support 5 will be released by the stroke between the lower movable pawls 20 and the spool 6 will be able to freely rotate. Further, when the spool support 5 is pushed down by the force of the spring 4 to be as shown on the left side in FIG. 1 and in FIG. 4(A) and is returned, the fixed pawls 3 will disengage from the lower movable pawls 20 and will be positioned between the upper movable pawls 19, the spool support 5 will be released by the stroke between the upper movable pawls 19 and the spool 6 will be able to freely rotate. By the above mentioned repetition, the nylon cord F can be payed out at a predetermined pitch.

In the above mentioned formation, according to the present invention, the spool 6 can be mounted and removed by hand without using tools.

That is to say, as shown in FIGS. 2 and 3, the nylon cord F wound on the spool 6 is pulled out at the free end by a predetermined length and is temporarily fixed in the proper position to the engaging projection 27 of the outside flange 26 of the spool 6.

Then, as shown in FIG. 3, the above mentioned nylon cords F are inserted at the free ends thereof through the guide holes 9 and 10 of the housing 1.

Then, the substantially L-like grooves 24 and 25 of the spool 6 are fitted at the openings respectively to the projections 21 and 22 of the spool support 5, the spool 6 is pressed against the spool support 5 side and is rotated in the direction reverse to the cutting rotating direction and the projections 21 and 22 of the spool support 5 are engaged respectively with the substantially L-like grooves 24 and 25 of the spool 6 at the front ends in the rotating direction of the head H. As a result, the spool 6 becomes integral with the spool support 5.

Thereafter, the nylon cord F may be removed from the engaging projection 27 of the outside flange 26 of the spool 6.

Further, in the present invention, as the nylon cord F engaging projection 27 is formed substantially in the central part of the punched hole 28 of the outside flange 26 of the spool 6, the nylon cord F can be removed from the above mentioned engaging projection 27 after the spool 6 is mounted.

That is to say, the nylon cord F exposed outside the engaging projection 27 may be removed with a finger from the engaging projection 27 and may be pushed into the inside of the punched hole 28.

Needless to say, if the above mentioned spool 6 or particularly the outside flange 26 is formed of a plastic having some flexibility, by only pulling the nylon cords F at the free ends out of the guide holes 9 and 10 of the housing 1, the nylon cords F will be able to be removed from the engaging projections 27. That is to say, when the nylon cord F is pulled, the flexible engaging projection 27 will flex and the nylon cord F will be easily removed and will not be required to be removed with a finger as mentioned above.

By the way, in removing the spool 6, reversely to mounting the spool 6, the spool 6 may be rotated in the reverse direction and may be pulled out downward.

As detailed in the above, according to the present invention, the spool support 5 repeating the release and connection of the rotation around the driving shaft 2 in some range with the fixed pawls 3 provided on the driving shaft 2 side by the reciprocation in the axial direction of the driving shaft by a predetermined stroke is provided, a plurality of projections 21 and 22 are provided in proper positions on the outer periphery of the spool support 5 and the substantially L-like grooves 24 and 25 in which, when the spool 6 is rotated as fitted to the above mentioned projections 21 and 22, the above mentioned projections 21 and 22 will engage with the head H at the front ends in the rotating direction are provided in the inner tube portion 23 of the spool 6. Therefore, when the substantially L-like grooves 24 and 25 of the spool 6 are fitted at the openings respectively to the projections 21 and 22 of the above mentioned spool support 5 and the spool 6 is pressed against the spool support 5 side and is rotated in the direction reverse to the operating rotating direction of the head H, the substantially L-like grooves 24 and 25 of the spool 6 will engage respectively with the projections 21 and 22 of the spool support 5 and the spool 6 will be mounted on the spool support 5, that is, driving shaft 2 side. By the way, in removing the spool 6, the spool 6 may be rotated in the direction reverse to the above mentioned mounting and may be pulled out downward.

In mounting the above mentioned spool 6, the nylon cord F is likely to be naturally released to get into trouble. However, in the present invention, the nylon cord F pulled by a predetermined length out of the spool 6 can be temporarily fixed in a proper position on the free end side thereof to the engaging projection 27 provided on the outside flange 26 of the spool 6 and further can be removed from the outside flange 26 even after the spool 6 is mounted because the above mentioned engaging projection 27 is provided substantially in the central part of the punched hole 28 of the outside flange 26, much to the convenience.

What is claimed is:

1. A flexible cord grass trimmer having a head comprising a housing, a drive shaft fixed to said housing for conjoint rotation, a spool disposed about said shaft on the outer surface of which is wound at least one cord, and a spool support slidably mounted over said drive shaft and interposed between said drive shaft and the inner surface of said spool, said spool support comprising an inner cylindrical member slidably disposed about said drive shaft, an outer cylindrical member spaced concentrically therefrom and integrally connected thereto, at least one L-shaped slot uniformly arranged in the inner surface of said spool opening out of the upper edge thereof and radially extending projections on the exterior surface of said spool support adapted to be received in said slots respectively, spring means biasing said spool support into releasable engagement with said spool, and means cooperating to cause selective engagement of said spool support and said drive shaft to provide conjoint rotation of said spool support in response to the rotation of said drive shaft and for overcoming said bias and release said spool support from engagement with said spool on movement of said spool axially relative to the drive shaft to permit said flexible cords to be played out from said spool, said inner and outer cylindrical members of said spool support are connected by two sets of pawls and said drive shaft is provided with cooperating pawls which are engageable and disengageable in response to the movement of spool relative to said drive shaft.

2. The trimmer according to claim 1 wherein said spool is provided with a radially extending flange having retaining means for releasably holding said flexible cord.

3. The trimmer according to claim 2 wherein said retaining means comprises a punched hole and a cord engaging finger cooperating therewith to hold said cord.

4. The trimmer according to claim 3 wherein said flange is formed of a flexible plastic.

* * * * *